July 4, 1933.   C. B. UPTON   1,916,347
PRESS CAGE
Filed May 30, 1930   2 Sheets-Sheet 1
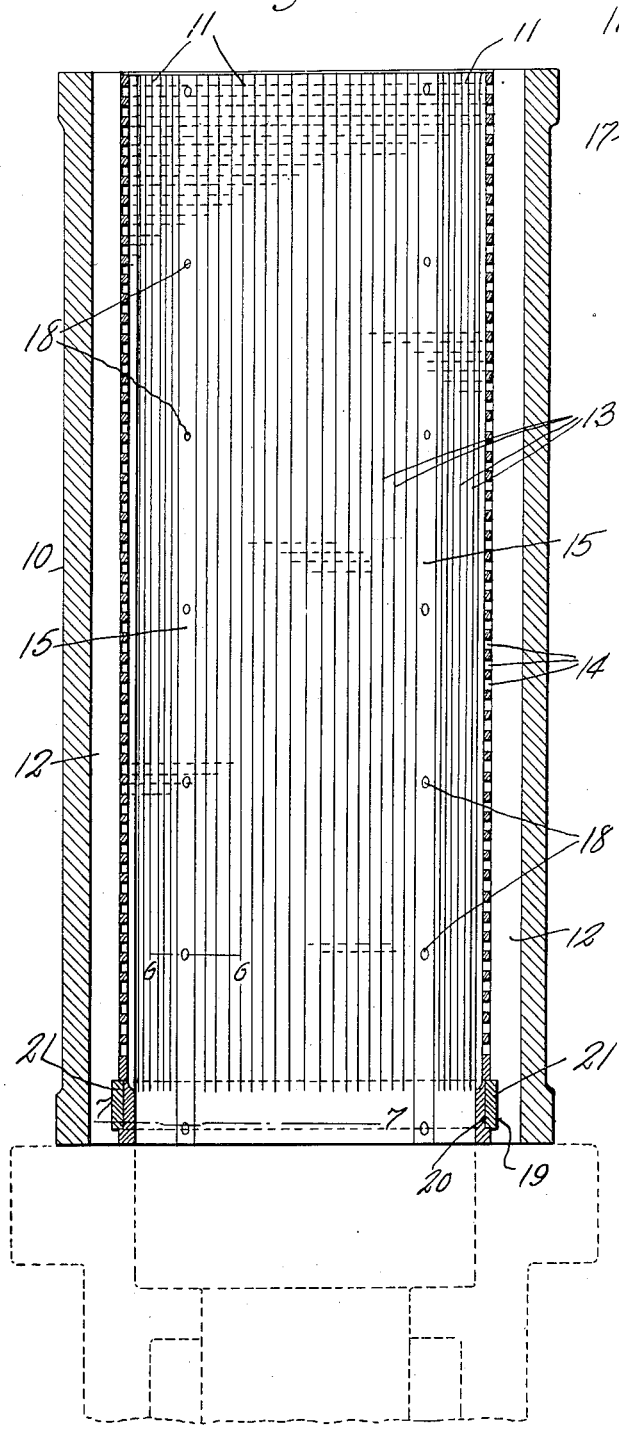
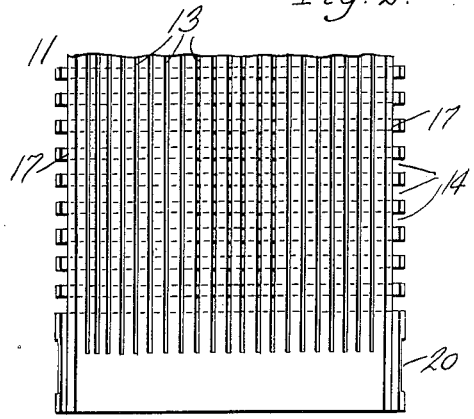
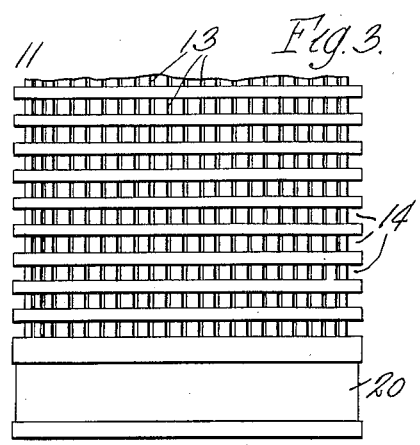
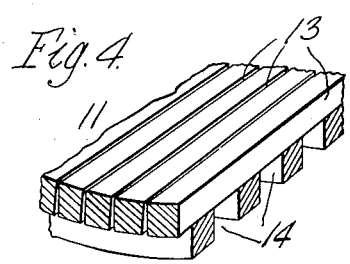
INVENTOR.
Charles B. Upton
by Parker & Carlow
ATTORNEYS.

July 4, 1933.      C. B. UPTON      1,916,347
PRESS CAGE
Filed May 30, 1930      2 Sheets-Sheet 2

INVENTOR.
Charles B. Upton
by Parker & Curchnow
ATTORNEYS

Patented July 4, 1933

1,916,347

UNITED STATES PATENT OFFICE

CHARLES B. UPTON, OF PIQUA, OHIO

PRESS CAGE

Application filed May 30, 1930. Serial No. 457,670.

This invention relates to improvements in cages for cage presses of the kind used for expressing oil from oil bearing materials such, for instance, as the crushed meats of cotton, flax and other seeds and nuts.

In such presses an open-ended vertical cage is ordinarily employed in which the oil bearing material, hereinafter, for convenience termed "meal", is placed in superposed layers or cakes alternating with metal press plates and press cloths arranged between the layers of meal so that each layer of meal will be disposed between two press cloths with the cloths between adjacent layers of meal separated by a press plate. The meal is compressed within the cage between opposing members which are relatively movable endwise of the cage, and the oil expressed from the meal flows laterally or horizontal between the press plates to the sides of the cage and escapes through suitable drainage openings in the upright side walls of the cage.

Heretofore cages of this type have been used comprising an outer shell or member which is lined interiorly with drainage plates provided with narrow slits or small openings of other form for the escape of the oil expressed from the meal. Ordinarily, the drainage plates have been flat, giving the cage an internal polygonal or other cross sectional form having flat sides where the drainage plates are located. For instance, the cages have been made interiorly square and also partially cylindrical, with one or more flat drainage walls. It has been found desirable, however, even in the cages having the flat drainage plates, to use an outer shell of substantially circular or cylindrical exterior form because of practical commercial reasons, such as superior strength of the shell and greater facility and economy of manufacture of the same. Cages for oil presses have also been made which are circular in cross section, both interiorly and exteriorly, but as heretofore constructed, these have not been satisfactory because the constructions employed either did not afford the necessary free drainage of oil to give the desired capacity without objectionable escape of the meal, or else the drainage openings would become clogged.

Specific objects of my invention are to provide a press cage of the type mentioned, which gives increased drainage for the oil and insures greater capacity and efficiency of operation of the press; which will reduce the time required for expressing the oil; which will insure the maximum yield of oil from the material; which will produce cake of uniform character having the lowest oil content and which do not have to be trimmed; which will eliminate soft portions or corners in the cake and avoid the necessity of trimming off these soft portions and repressing the same to recover the oil which remains therein; which will have large drainage passage for the oil of substantially uniform size and disposed substantially completely around the interior of the shell; which will insure substantially uniform escape of the oil from all portions of the material, and at all points around the periphery of the cakes.

Another object of the invention is to produce a press cage for oil expressing presses which has the other features of improvement and advantage hereinafter described and set forth in the claims.

The accompanying drawings illustrate one construction exemplifying a practical embodiment of the invention.

In said drawings:

Fig. 1 is a vertical sectional elevation of the cage.

Fig. 2 is an inside elevation of the lower portion of one of the drainage plates removed from the cage.

Fig. 3 is an outside elevation thereof.

Fig. 4 is a perspective view of a portion of one of the drainage plates.

Figure 6:
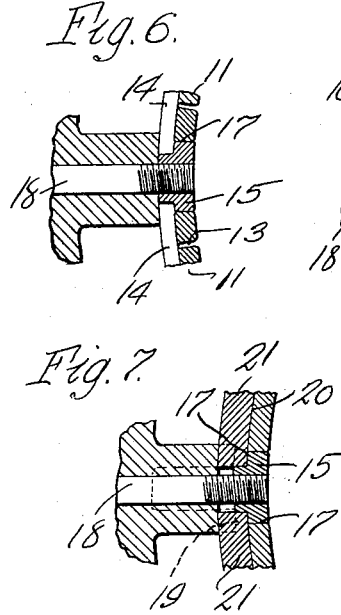
Fig. 6 is an enlarged detail sectional plan view of the cage on line 6—6, Fig. 1.

The cage comprises an outer shell or jacket 10 which preferably is of substantially cylindrical form, or circular in cross section, and consists of a single, integral steel casting, and curved drainage or lining plates 11 which are secured in the shell and extend substantially continuously around the interior of the shell, these drainage plates being provided with suitable drainage openings through which the oil expressed from the meal can escape into vertical passages or channels 12 formed in the inner side of the shell.

In the preferred construction of the drainage plates shown in the drawings, each plate is provided with spaced, vertical narrow drainage slits 13 in its inner side or face, which are intersected by and communicate with transverse circumferential grooves 14 in the outer faces or sides of the drainage plates. The slits 13 permit the oil to pass therethrough into the transverse grooves 14 in the outer sides of the drainage plates which intersect and communicate with the vertical channels 12 in the shell 10, but the slits 13 are sufficiently narrow to prevent the escape of meal therethrough in any considerable quantity. The drainage plates, however, could be provided with drainage openings or perforations of other form or arrangement adapted to permit the escape of the oil therethrough while preventing as far as possible the escape of the foots. However, in practice it is not possible to prevent the escape of some of the fine meal or foots with the oil through the narrow slits or openings in the inner sides of the drainage plates, but the relatively much larger communicating transverse grooves 14 in the outer faces of the drainage plates and the still larger vertical channels 12 in the shell 10 with which the transverse grooves 14 communicate provide passages of ample area to ensure free escape of the oil and fine solid material and prevent the latter from accumulating in and clogging the narrow or fine drainage slits or openings 13 in the drainage plates. If the grooves 14 and channels 12 were not large enough to allow a copious flow of oil through them and thus wash out the escaping fine meal, the latter would gradually accumulate in the passages until the drainage slits would become clogged and prevent the escape of the oil.

Figure 7:
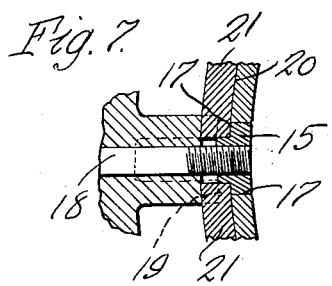
Fig. 7 is a similar view on the line 7—7, Fig. 1.
Figure 5:
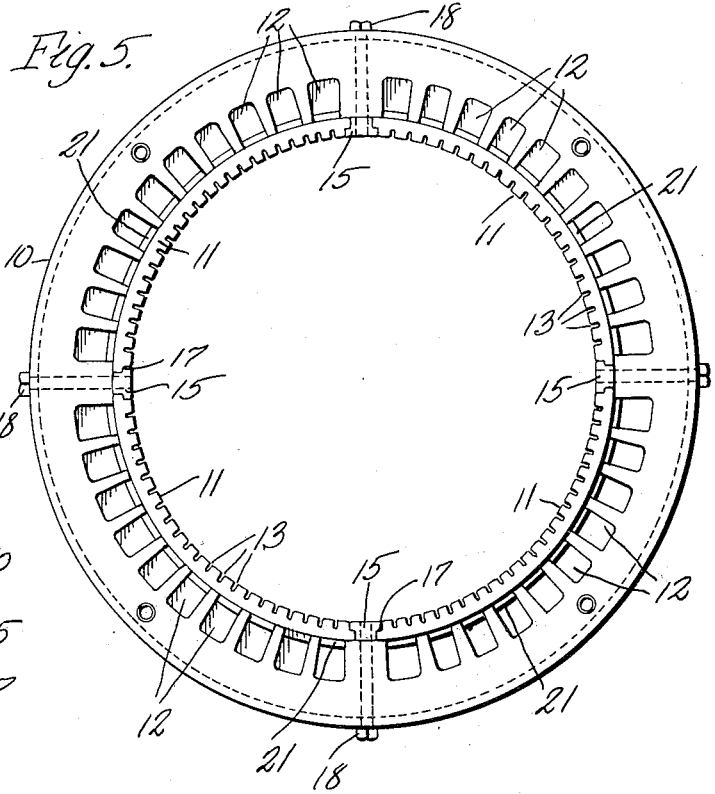
Fig. 5 is a top plan view of a cage.
Figure 8:
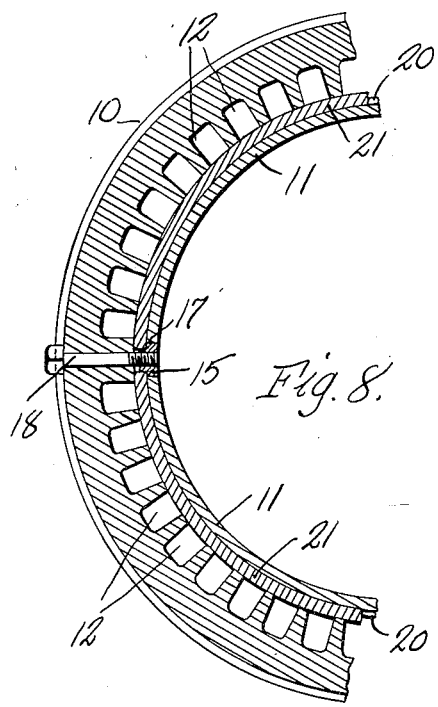
Fig. 8 is a fragmentary horizontal section of the cage on line 7—7, Fig. 1.
Figure 9:
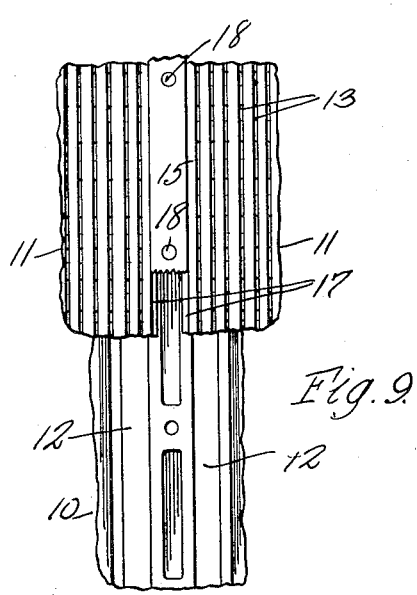
Fig. 9 is a fragmentary inside elevation showing the securing means for the vertical edges of the drainage plates.

The drainage plates 11 are stationarily, but removably secured in the shell against the channeled interior face thereof, preferably by means of vertical securing bars 15 which are arranged between the adjacent vertical edges of the drainage plates and have side flanges or shoulders, see Figs. 6 and 7, which extend into rabbets 17 in the vertical side edges of the drainage plates. These securing bars 15 can be attached to the shell by suitable means, such as bolts or screws 18, passing through radial holes in the shell and screwed into threaded holes in the securing bars 15. The bars 15 hold the drainage plates from movement horizontally or circumferentially in the shell, and in order to secure the drainage plates against vertical movement or shifting in the shell, the shell is preferably provided interiorly adjacent its lower end with a circumferential groove 19 which registers with circumferential grooves 20 formed in the outer faces of the drainage plates, and curved locking strips or keys 21 occupy these registering grooves 19 and 20, the keys preferably extending from one to another of the vertical securing bars 15. The locking keys 21 are placed between the drainage plates and the shell in the grooves 19—20 when the drainage plates are placed in position against the inner face of the shell, and then when the drainage plates are secured by fastening the vertical securing bars 15 in place, the locking keys will be secured in the grooves 19—20 and will lock the drainage plates against shifting vertically in the shell.

It will be noted that except for the relatively narrow vertical securing bars 15 between the adjacent vertical edges of the drainage plates, the drainage plates 11 extend completely around the interior periphery of the cage so that the drainage slits or openings 13 in the plates extend substantially continuously around the interior of the shell and therefore provide for a substantially uniform escape of the oil from the material around the whole circumference of the cage. Since the cage thus constructed is of circular, interior cross section, the drainage slits or openings are equidistant from the center of the cage at all points around the cage, and consequently the oil has the same distance to travel from the center of the cakes to the drainage plates at any point circumferentially of the cage, and this is true also with regard to the distance which the oil must travel from any intermediate points in the cakes at corresponding distances from the center of the cakes, irrespective of the disposition of such points circumferentially with respect to the cage. This construction, therefore, prevents the formation of soft corners or portions in the cakes which occur in the corners between the flat plates or inner wall parts in cages of square or other interior cross sectional shape in which the distance from the center of the cage to these corners is greater than the distance from the center of the cake to the drainage plates at points intermediate of the corners or side edges of where the flat plates are joined together or secured to the cage.

Furthermore, since the shell is of concentric circular form interiorly and exteriorly, the shell is of uniform thickness throughout its circumference, and the drainage channels or passages 12 in the shell can be made of ample size and of uniform width and depth at all points around the shell so that the channels 12 which are adjacent the side edges of the drainage plates are equally as large as the remaining channels which are located intermediate of the side edges or at the middle portions of the drainage plates. This is not possible in a cage in which the shell is of circular exterior shape, but provided with flat drainage plates, since with such formation the drainage channels or passages 12 in the shell would necessarily be of less depth near the edges of the drainage plates than at the middle or intermediate portions of the plates, if the shell is to be as thick and strong adjacent the edges of the drainage plates as it is at points intermediate of the edges of the flat plates. The shallower channels near the side edges of the drainage plates do not afford adequate passages for the oil and escaping fine material, and the channels and drainage openings of the plates will become clogged and prevent the drainage of the oil from the cakes in the vicinity of these shallow channels. It is also hard to clean out the shallow channels.

The cage constructed as described has a much larger drainage area and holding capacity than a cage of similar external dimensions and strength with flat drainage plates. This means not only an increased capacity in tonnage of meal handled, but also an increased drainage capacity, which results in greater operating efficiency.

I claim as my invention:

1. A cage for oil expressing presses comprising a shell which is of substantially circular interior cross section, drainage plates of substantially segmental circular cross section arranged interiorly in said shell and provided with oil drainage openings, longitudinal securing bars attached to said shell between and engaging the longitudinal side edges of said drainage plates for securing the plates to the shell, said shell and drainage plates having registering circumferential grooves and locking keys extending circumferentially of the cage between said securing bars in registering circumferential grooves in said shell and drainage plates, for securing said drainage plates against longitudinal movement in said shell.

2. A cage for oil expressing presses, comprising a tubular shell having channels running in a direction endwise thereof on its inner face, drainage plates apertured from face to face and disposed approximately edge to edge with one another and against the inner face of said shell to form a lining therefor, said plates running lengthwise of said shell, securing strips having opposed shoulders disposed in and running lengthwise of said shell and at their side edges overrunning the exposed faces of said plates, at the adjacent edges of said plates, so as to confine said plates to said shell, means removably connecting said strips to said shell, said shell and plates having aligned grooves in abutting faces, and key means in said aligned grooves and locking said plates against movement in a direction endwise of said shell.

3. A cage for oil expressing presses, comprising a tubular shell having channels running in a direction endwise thereof on its inner face, drainage plates apertured from face to face and disposed approximately edge to edge with one another and against the inner face of said shell to form a lining therefor, said plates running lengthwise of said shell, securing strips having opposed shoulders disposed in and running lengthwise of said shell and at their side edges overrunning the exposed faces of said plates, at the adjacent edges of said plates, so as to confine said plates to said shell, means removably connecting said strips to said shell, and locking means between the abutting faces of said plates and shell for preventing movement of said plates in a direction endwise of the shell, and rendered effective by the movement of said plates against the inner faces of the shell before said strips are applied to lock said plates to said shell.

CHARLES B. UPTON.